United States Patent [19]

Cowley

[11] 4,336,228

[45] * Jun. 22, 1982

[54] CHLORINE DIOXIDE GENERATOR

[75] Inventor: Gerald Cowley, Mississauga, Canada

[73] Assignee: ERCO Industries Limited, Islington, Canada

[*] Notice: The portion of the term of this patent subsequent to Jun. 30, 1998, has been disclaimed.

[21] Appl. No.: 189,645

[22] Filed: Sep. 22, 1980

Related U.S. Application Data

[60] Division of Ser. No. 82,853, Oct. 9, 1979, which is a continuation-in-part of Ser. No. 964,681, Nov. 29, 1978, Pat. No. 4,203,961.

[51] Int. Cl.³ .................................................. B01J 8/00
[52] U.S. Cl. ..................................... 422/129; 422/224
[58] Field of Search ............... 423/478; 159/6, 27 R, 159/27 A, 27 D, 27 E, 45; 261/79 A, 112; 55/92, 228, 238; 422/178, 205, 228, 229, 234, 235, 240, 241, 129.

[56] References Cited

U.S. PATENT DOCUMENTS

| | | | |
|---|---|---|---|
| 965,388 | 7/1910 | Kestner | 159/27 A |
| 1,317,488 | 9/1919 | Garrigne | 159/27 A |
| 2,199,320 | 4/1940 | Le Juge | 159/27 A |
| 3,529,939 | 9/1970 | Mason | 159/27 A |
| 3,722,185 | 3/1973 | Miczek | 261/112 |
| 3,816,077 | 6/1974 | Fuller | 423/478 |
| 3,895,100 | 7/1975 | Cowley | 423/478 |
| 3,975,506 | 8/1976 | Cowley | 423/478 |
| 3,990,870 | 11/1976 | Miczek | 261/112 |
| 4,113,552 | 9/1978 | Bella | 159/27 A |
| 4,276,262 | 6/1981 | Cowley | 422/187 |

FOREIGN PATENT DOCUMENTS 935756 10/1973 Canada ............................. 159/6 R Primary Examiner—Brian E. Hearn
Attorney, Agent, or Firm—Sim & McBurney

[57] ABSTRACT

The entrainment of reaction medium in the vapor phase and the entrainment of gaseous phase in liquid phase are decreased in a chlorine dioxide generator (12) producing a gaseous mixture of chlorine dioxide, chlorine and steam from a boiling reaction medium (14) and wherein generator liquor is recycled with make up chemicals. These results are achieved by generator modifications, which include tangential entry (30) of recycled liquor to the generator (12) in the vapor space (16) above the liquid level in the generator (12), and the provision of a baffle (34, 50) projecting inwardly from the generator wall in the vapor space (16) and arranged to be above the trajectory of the recycled liquor as it enters the generator (12). These modifications enable the generator volume to be decreased substantially, with consequentially decreased capital costs.

12 Claims, 5 Drawing Figures

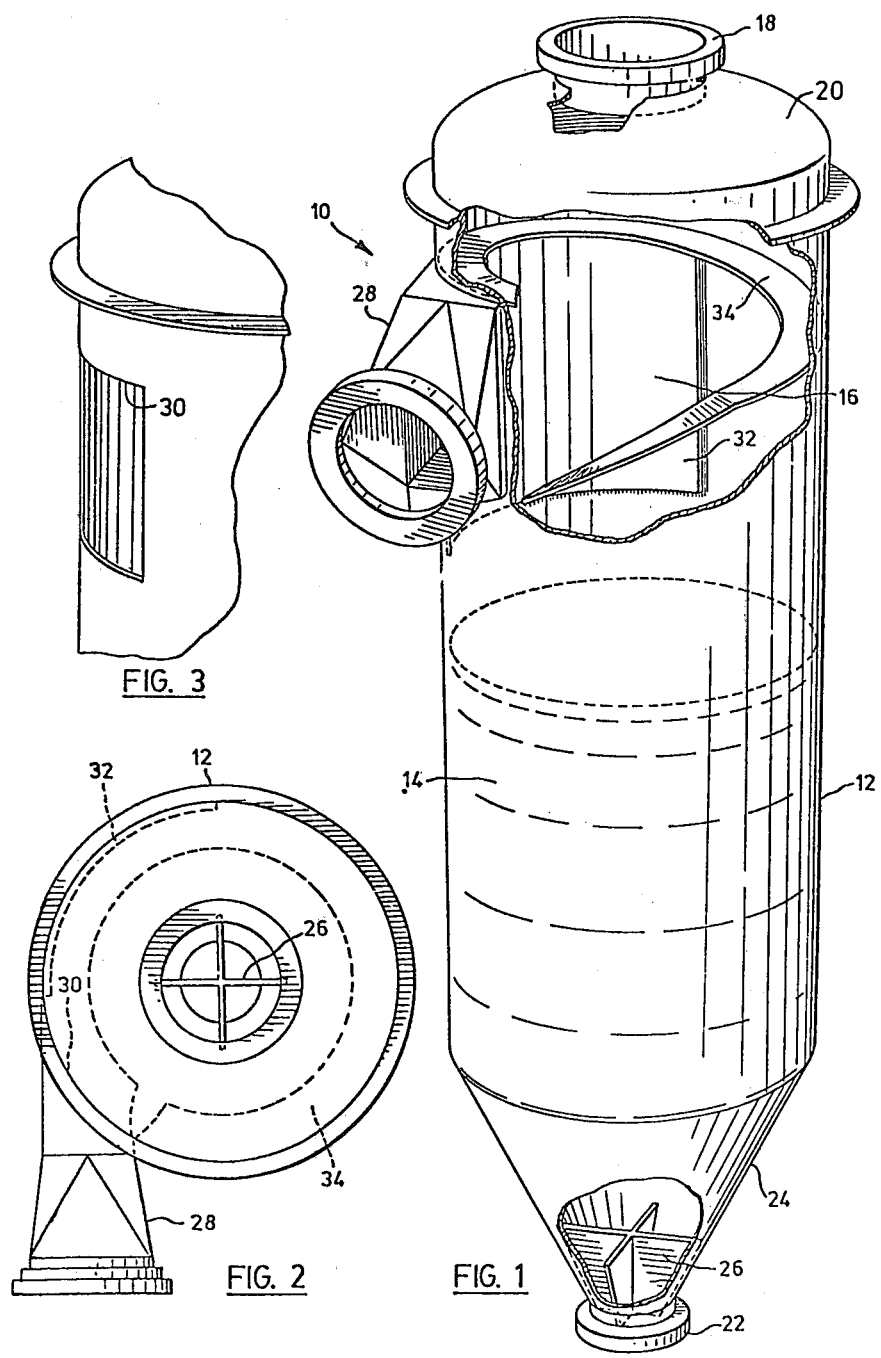

CHLORINE DIOXIDE GENERATOR

REFERENCE TO RELATED APPLICATIONS

This application is a division of application Ser. No. 082,853 filed Oct. 9, 1979 which itself is a continuation-in-part of application Ser. No. 964,681 filed Nov. 29, 1978, now U.S. Pat. No. 4,203,961.

FIELD OF INVENTION

The present invention relates to novel chlorine dioxide generators and to the production of chlorine dioxide using such generators.

BACKGROUND TO THE INVENTION

Chlorine dioxide is utilized in a variety of bleaching operations, particularly in the bleaching of cellulosic fibrous material, such as, wood pulp. In U.S. Pat. Nos. 3,895,100 and 3,975,506 assigned to the assignee of this application, the disclosures of which are incorporated herein by reference, there is disclosed a chlorine dioxide generating process and equipment therefor wherein chlorine dioxide is formed in a generally cylindrical upright reaction vessel by reduction of an alkali metal chlorate, usually sodium chlorate, with chloride ions in an aqueous acid reaction medium, in accordance with the equation:

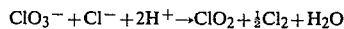

$$ClO_3^- + Cl^- + 2H^+ \rightarrow ClO_2 + \tfrac{1}{2}Cl_2 + H_2O$$

The reaction medium in the generator is maintained at its boiling point, generally about 25° to about 90° C., under a subatmospheric pressure, generally about 20 to about 400 mm Hg, to cause the deposition of a by-product salt from the reaction medium in the generation vessel once saturation has been achieved after start-up and to remove the chlorine dioxide and chlorine in gaseous admixture with steam.

The by-product salt which is precipitated depends on the acid used in the reaction medium, the by-product being a sodium sulphate when sulphuric acid is used and sodium chloride and/or hydrogen chloride provide the chloride ion reducing agent, and the by-product being sodium chloride when hydrochloric acid is used and also provides the reducing agent.

When sulphuric acid is used, the sodium sulphate may be in an acidic or neutral form depending on the total acid normality of the generator, with a neutral salt generally being obtained at total acid normalities of about 2 to about 5 normal and acid salts being obtained at higher values usually up to about 12 normal.

When the total acid normality of a sulphuric acid based system is such as to produce neutral sodium sulphate, it is preferred to use a reaction temperature above about 30° C. in order to obtain the anhydrous salt.

When hydrochloric acid is used, the actual hydrogen ion concentration in the reaction medium is maintained in the range of about 0.05 to about 0.3 normal. The term "actual hydrogen ion concentration", as used herein, is the value determined by a pH meter calibrated on an 0.1 normal solution of hydrochloric acid on the assumption that such a solution is 100% dissociated at this concentration.

As described in the above-mentioned patents, the solid by-product is removed as a slurry in reaction medium from the generator vessel, sodium chlorate solution is mixed therewith, the mixture is recycled through a reboiler wherein the mixture is heated to the reaction temperature and forwarded to the reaction vessel after the addition of acid to the heated mixture. A portion of the slurry is withdrawn prior to the reboiler for crystal separation.

The heated mixture from the reboiler is passed through a venturi-like pipe which exerts sufficient back pressure on the mixture in the reboiler to prevent boiling therein, acid in concentrated form is introduced to the collar of the venturi and the resultant reaction mixture is allowed to expand at low acceleration to permit boiling and gaseous product formation to occur evenly and gradually and thereby avoid bumping and vibration, so that a fluid mixture of solid phase, liquid phase and gaseous phase is formed and this fluid mixture enters the generator generally radially of the generator above the liquid level therein through a curved pipe joining the downstream end of the venturi-like pipe and the generation vessel inlet.

While this prior art procedure represents an excellent commercially-viable chlorine dioxide generating system having many advantages over prior art arrangements, as described in the above-mentioned patents, it has been found that entrainment of liquid and solid phases in the gaseous phase occurs, necessitating a considerable vapor space in the generator to achieve separation of the entrained material by the action of gravitational forces, otherwise the entrained material passes out of the generator with the removed gases, presenting problems in later-processing of the gases and is considered undesirable.

Additionally, it has been found that the radial entry of the fluid mixture causes considerable splashing of reaction medium and entrainment of gaseous material in the reaction medium. A considerable reaction medium volume is required to permit the entrained gaseous material to disengage from the reaction medium, otherwise chlorine dioxide and chlorine exit the generator in the by-product slurry stream and cause considerable difficulties upon exposure to atmosphere at the solid by-product filter.

At the time of the making of the inventions of the above-mentioned U.S. Pat. Nos. 3,895,100 and 3,975,506 chlorine dioxide generators were constructed from glass fibre reinforced plastics (FRP's) and typical dimensions of a 10 ton per day chlorine dioxide generator were a diameter of about 9 ft, a vapor height of about 10 ft, and an overall height of about 35 ft, giving a total volume of about 2000 cu. ft and a vapor space volume of about 650 cu. ft. These dimensions were adequate to permit the desired disentrainments.

However, FRP's have been found not to be wholly satisfactory as a material of construction for chlorine dioxide generators owing to unsatisfactory wear characteristics and titanium has replaced FRP's as the material of construction, as a result of its high corrosion and wear resistance and excellent constructional qualities. In view of the high cost of this metal, there has been a distinct trend to provide smaller volume chlorine dioxide generators and design parameters for a 10 ton/day chlorine dioxide generator constructed of titanium typically result in a diameter of about 7 ft, an overall height of about 20 ft and a vapor space height of about 6 ft. The overall volume of the generator thereby is decreased to about 750 cu. ft and the vapor space volume is decreased to about 230 cu. ft, i.e., approximately ⅓rd of the respective volumes of the same capacity generator constructed of FRP.

The large decrease in vapor space and reaction medium volumes renders the gas-liquid entrainment problems noted above acute and no longer permits the radial-type entry of recycled fluid mixture to the generator without encountering the difficulties of passage out of the generator of entrained reaction medium with gaseous phase and passage out of the generator of entrained gaseous phase with reaction medium.

One prior art suggestion for overcoming the problem of entrainment of liquid phase in gaseous phase without the use of excessive vapor space is to use an internal demister, as described, for example, in U.S. Pat. No. 4,079,123, but such demisters, consisting usually of wire mesh through which the vapor phase passes and on which the liquid droplets impinge, are prone to clogging especially since the solid phase is also present, and hence must be cleaned frequently if chlorine dioxide production is to be sustained. As far as we are aware there have been no prior art suggestions for overcoming the problem of entrainment of gaseous phase in the reaction medium without the use of excessive reaction medium volume.

SUMMARY OF INVENTION

In accordance with the present invention, modifications to the generation system described in our U.S. Pat. No. 3,895,100 are effected in order to decrease entrainment of liquid and solid in the vapor phase and entrainment of vapor phase in the reaction medium and thereby permit a decrease in the vapor space volume without the need to use mesh or other type demisters and a decrease in the reaction medium volume.

One such modification involves provision of tangential entry for recycled fluid to the vapor space. Such tangential entry causes the recycled fluid mixture to pass around the interior wall of the generator and to lose velocity before it encounters the reaction medium. Gas phase and liquid phase separation is permitted to a certain degree prior to the mixture encountering the reaction medium, whereby entrainment is decreased.

An additional modification is the provision of baffle means projecting from the internal wall of the generator substantially through 360° of turn above the theoretical trajectory of liquor tangentially entering the generator and passing around the internal wall. The baffle means deflects the gas phase separating from the liquid phase radially inwardly of generator wall to enhance the separation.

The tangential entry of the recycled mixture and the provision of the baffle means permit a smaller diameter vessel of lesser vapor space and reaction medium volume to be used without encountering the prior art problems noted above. Provision of a smaller diameter generally results in less material of construction being necessary for the generator.

GENERATOR DESCRIPTION OF INVENTION

The tangential entry of the recycled fluid mixture of solid phase, liquid phase and gaseous phase into the vapor space, in accordance with this invention, and subsequent entry of the solid and liquid phases into the reaction medium imparts spin to the body of reaction medium. Centrifugal forces resulting from such spin cause the reaction medium surface to assume an approximately parabolic shape and the reaction medium to climb the internal generator wall. The baffle means used in this invention, in addition to enhancing gas and liquid phase separation as described above, also serves to limit the upward extent of climb of reaction medium.

BRIEF DESCRIPTION OF DRAWINGS

FIG. 1 is a perspective view with parts cut away of a chlorine dioxide generator constructed in accordance with one preferred embodiment of the invention; and FIG. 2 is a view from below of the generator of FIG. 1;

FIG. 3 is a detail view of part of the generator of FIG. 1 with the entry pipe removed;

DESCRIPTION OF PREFERRED EMBODIMENTS

Figure 4:
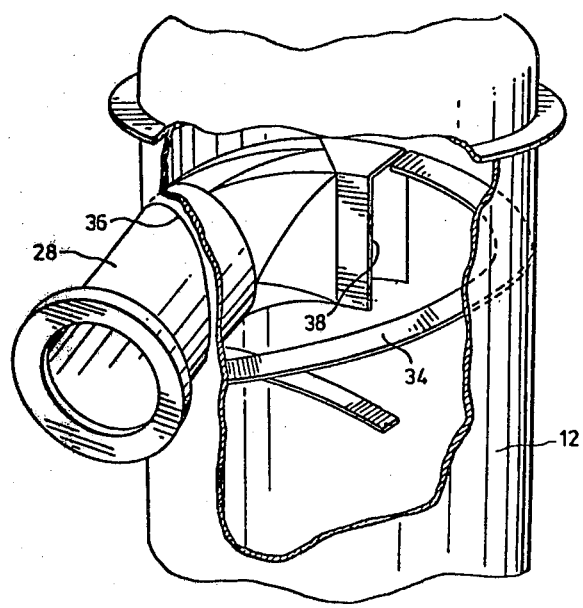
FIG. 4 is a perspective view, with parts cut away, of part of a chlorine dioxide generator utilizing an alternative mode of entry of the recycled liquor to the vapor space and constructed in accordance with a second embodiment of the invention.

Referring first to FIGS. 1 to 3 of the drawings, a chlorine dioxide generator 10 constructed in accordance with a preferred embodiment of the invention comprises a generally cylindrical upright vessel 12 fabricated of any convenient corrosion-and wear-resistant material, preferably titanium.

The generator vessel 12 contains liquid reaction medium 14 which produces a gaseous mixture of chlorine dioxide, chlorine and steam which is removed from the vapor space 16 above the liquid level through a gaseous outlet 18 located in a top closure 20.

The reaction medium 14 is maintained at its boiling point under a subatmospheric pressure applied to the vapor space 16 through the gaseous outlet 18. In continuous operation, a solid by-product salt precipitates from the liquid reaction 14 and is removed through a solid outlet 22 located at the lower end of the vessel 12 in communication with a conical bottom closure element 24 as a slurry with reaction medium. The slurry then is processed to remove part of the solid phase and a recycle heated reaction mixture is formed, as described in detail in U.S. Pat. No. 3,895,100, referred to above.

A vortex breaker element 26, consisting of mutually perpendicularly arranged baffles, is located in the bottom closure 24 adjacent the slurry outlet 22 to break up rotational movement of the reaction medium 14 adjacent the slurry outlet 22.

The heated reaction mixture recycle pipe illustrated in U.S. Pat. No. 3,895,100 communicates with a horizontally-directed inlet pipe 28 which increases in cross-sectional area in the direction of flow of the reaction mixture and terminates in a rectangular opening 30 in the side wall of the generator vessel 12 above the level of the reaction medium 14. The inlet pipe 28 extends generally tangentially to the vessel wall so that recycled heated reaction mixture enters the vapor space 16 generally tangentially to the internal wall of the generator vessel 12, in contrast to the radial entry illustrated in the above-mentioned U.S. patent.

The recycled heated reaction mixture contains crystalline by-product salt which is abrasive in character. Although titanium is a highly wear-resistant material, it is preferred to construct the vessel 12 with a titanium liner 32 at least in the initial region of movement of the recycled heated reaction mixture between its entry to the vessel 12 and the reaction medium 14. In the event of excessive wear, the liner 32 may be replaced.

Extending horizontally inwardly from the internal wall of the vessel 12 is a baffle 34. In the embodiment of FIGS. 1 to 3, the baffle 34 extends in generally helical manner from a location just above the inlet opening 30 through 360° of turn to terminate just below the level of the inlet opening 30. The baffle 34 may extend further, if desired, into the reaction medium 14.

The baffle 34 approximates but is located above the intended trajectory of the recycled reaction mixture along the internal wall of the vessel 12 to the reaction medium 14.

The location of the baffle 34 above the intended trajectory prevents impingement of the mixture thereon which may impair liquid separation and cause liquid to climb up the internal wall of the generator vessel 12. The baffle 34 also prevents liquor from the spinning vortex of reaction medium from rising along the internal wall past the height of the baffle in the vessel 12.

Any liquor which does rise up the internal wall of the generator vessel 12 above the baffle 34 is prevented from entering the outlet pipe 18 by the downward projection of the cylindrical outlet pipe 18 into the vapor space 16 of the generator vessel 12 and below the top closure 20, as illustrated.

The baffle 34 prevents the gaseous phase in the recycled reaction mixture entering through opening 30, which is a fluid mixture of liquid phase, solid phase and gaseous phase as described in U.S. Pat. No. 3,895,100, from proceeding upwardly in the vapor space 16, taking with it entrained liquid and solid phases. Instead, the baffle 34 forces the gaseous phase initially to follow the trajectory of the liquid and solid phases and to move effectively radially of the internal wall of the vessel 12 before moving upwardly in the vapor space 16 when it clears the radially inner edge of the baffle 34.

This gaseous phase motion causes separation from the liquid and solid phases which tend to remain in the same trajectory and hence entrainment of these materials in the gaseous phase is decreased, permitting the cross-sectional area of the generator vessel 12 to be decreased, as compared with the radial-entry and no-baffle arrangement illustrated in U.S. Pat. No. 3,895,100. As already noted, for example, for a given reaction vessel of a given chlorine dioxide production capacity and operating under the same conditions and flow rates, the overall generator vessel 12 cross-sectional area may be decreased by about 40% through the use of this invention. The tangential entry of the recycled mixture and the formation of a spinning vortex of reaction medium 14 in the generator 12 also considerably decrease entrainment of gaseous phase in the reaction medium.

For ease of fabrication of the baffle 34, it is usually constructed, as illustrated, of a plurality of segments which are joined to form a continuous baffle, each segment typically extending for 90° of turn or a multiple thereof with its slope being rectilinear from end to end and approximating the average of the trajectory of the liquid passing around the internal wall in the particular curvilinear region of location of the baffle segment.

Alternatively, the baffle 34 may be provided as a continuous baffle which is continuously shaped along its length to approximate at any given location the trajectory of the liquid passing around the internal wall of the generator vessel 12.

The required location and slope of the baffle 34 depends on a number of factors, including the velocity of the fluid entering the port 30 and the internal diameter of the generator vessel 12, and can be readily calculated using conventional engineering principles.

The transverse dimension, or width, of the baffle 34 may vary widely and is generally related to the width of the rectangular inlet port 30. Preferably, the width of the baffle 34 is about 30 to about 60 percent of the width of the rectangular inlet port 30, and most preferably about one-half of the width, since the most efficient separation of entrained material occurs at this dimension.

The rectangular inlet port 30 is dimensioned in relationship to the internal diameter of the generator vessel 12, so that the width is less than, and preferably approximately equal to, about 25 percent of the internal diameter of the vessel 12, since liquid separation from the gaseous phase is generally less satisfactory at higher values.

Figure 5:
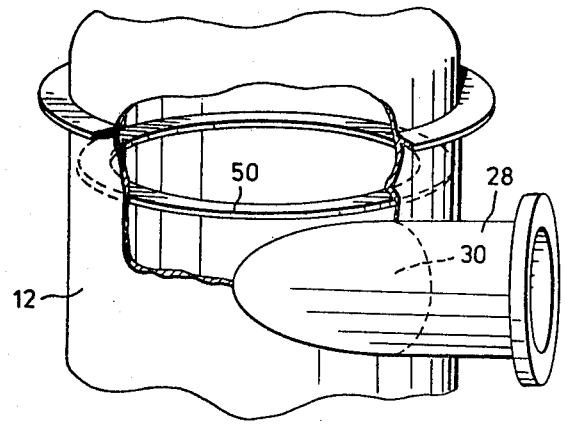
FIG. 5 is a perspective view, with parts cut away, of a chlorine dioxide generator utilizing an alternative baffle structure and a further alternative mode of entry of recycled liquor to the vapor space, and constructed in accordance with a third embodiment of the invention.

The inlet port 30 is illustrated as rectangular in shape, but any other desired shape may be used, for example, circular or oval. An oval inlet port is illustrated in FIG. 5 discussed below. The actual shape of the inlet port 30 has little effect on the operation of the generator.

Referring now to FIG. 4, wherein there is disclosed an alternative recycled heated reaction mixture entry arrangement, the same reference numerals are used to identify the same parts as are described above in connection with the embodiment of FIGS. 1 to 3.

In the embodiment of FIG. 4, instead of the inlet pipe 28 terminating at a rectangular or other shaped opening 30 in the wall of the vessel 12 to achieve tangential entry, the pipe 28 passes through an opening 30 in the wall of the vessel 12 in sealing relationship therewith and then follows the internal wall of the vessel 12 to terminate in a rectangularly-shaped opening 38 to establish the tangential entry. The baffle 34 commences immediately at the termination of the inlet pipe 28.

The dimensional relationships described above with respect to FIGS. 1 to 3 between the baffle 34 and the rectangular opening 30 apply in connection with the embodiment of FIG. 4 as between the baffle 34 and the rectangular opening 38.

While the rectangular opening 38 and the passageway leading thereto in the increasing cross-sectional area of the inlet pipe 28 may be enclosed on four sides, it is preferred, as illustrated, to omit the bottom wall.

In the embodiment of FIG. 5, the complex helical baffle 34 of the embodiments of FIGS. 1 to 4 is replaced by a continuous ring baffle 50 projecting from the inner wall of the vessel 12 above the level of the inlet port 30. The circular baffle 50 is effective to enhance vapor-liquid separation and prevent reaction medium climb, in similar manner to helical baffle 34.

The inlet port 30 in this embodiment has an oval shape as the result of the tangential arrangement of circularly cross-sectioned inlet pipe 28 to the generator vessel 12. The inlet arrangement is less complicated than the rectangular arrangement shown in FIGS. 1 to 4, in that shaping of the downstream end of the inlet pipe 28 is not required.

The tangential entry of recycled reaction mixture to the generator vessel 12 under the influence of energy imparted thereto by expanding steam in the recycle pipe causes the reaction medium 14 to rotate in the generator vessel and to acquire the steam-imparted energy. In place of breaking this motion at the outlet port 22 using the vortex breaker 26 as illustrated, a tangential outlet may be provided adjacent a suitably-designed bottom closure and the motion energy of the exiting reaction medium may be used to replace part of the pumping energy required for recirculation, so that the overall energy requirements of the system are decreased.

EXAMPLE

Chlorine dioxide was produced from a chlorine dioxide generator having the structure shown in FIGS. 1 to 3 having a capacity of 14 tons/day. The chlorine dioxide was produced from reactants sodium chlorate, sodium chloride and sulphuric acid at the boiling point of the reaction medium (about 70° C.) under a subatmospheric pressure (about 190 mm Hg) and anhydrous sodium sulphate was precipitated from the reaction medium in the vessel.

The vessel had a diameter of 7 ft. and the baffle was made up of four sections each extending for 90° of turn from the rectangular entrance port. The baffle had a width of 10½ inches and the entrance port was dimensioned 1'9" wide by 3'6" high. The first 90° section of the baffle had a slope of 1:20, the second 90° section had a slope of 1:10, the third 90° section had a slope of 1:4 and the fourth 90° section had a slope of 1:2.

The mass vapor velocity of the chlorine dioxide, chlorine and steam leaving the gaseous outlet was 142 lb/hr./sq.ft. and it was determined that the liquor entrainment in the gaseous product stream was 5.5 lb./hr.

In a parallel operation, a 14 ton/day chlorine dioxide generator having the structure illustrated in U.S. Pat. No. 3,895,100, namely with the recycle pipe arranged radially of the generator, in place of the tangential entry and baffle arrangement of FIGS. 1 to 3. In this instance, the generator had a diameter of 9 feet but otherwise was dimensioned the same and produced chlorine dioxide from the same reactants under the same conditions.

At the mass vapor velocity of chlorine dioxide, chlorine and steam leaving the gaseous outlet of 142 lb/hr./sq.ft., the amount of liquor entrained in the product stream was found to be 49.22 lb/hr. It will be seen from the results that, despite decreasing the diameter of the generator vessel, a considerable decrease in entrainment of liquid in the gaseous phase was achieved using the structure of FIGS. 1 to 3, as compared to the prior art radial baffleless entry.

SUMMARY OF DISCLOSURE

In summary of this disclosure, the present invention, therefore, provides a chlorine dioxide generator having advantages over other prior art equipment wherein a fluid recycle stream consisting of a recycle mixture of gaseous phase, solid phase and liquid phase enters the vapor space of the generator. Modifications are possible within the scope of the invention.

What I claim is:
1. A chlorine dioxide generator, comprising:
a generally right cylindrical vertically-extending body having upper and lower end closures, gaseous outlet means located in or adjacent to said upper end closure and slurry outlet means located in or adjacent to said lower end closure,
inlet means arranged tangentially to said cylindrical body terminating at its downstream end in communication with the interior of said body above the intended liquid level therein and below said gaseous outlet means for projection of reaction mixture into said body generally tangentially thereto,
planar ring baffle means projecting substantially horizontally inwardly from and perpendicularly with respect to the internal wall of said cylindrical body and located immediately above the upper extremity of the downstream termination of said inlet means.

2. The generator of claim 1, wherein said inlet means terminates at its downstream end in a side wall opening of said body.

3. The generator of claim 2, wherein said inlet means comprises a pipe of generally circular cross section extending tangentially to said body and terminating at its downstream end in an oval opening in said side wall.

4. The generator of claim 1, wherein said inlet means extends through said side wall and terminates at its downstream end in the interior of said body.

5. The generator of claim 1, wherein said inlet means increases in cross-sectional area between the upstream and downstream ends thereof and terminates at its downstream end in a generally rectangularly-shaped opening.

6. The generator of claim 5, wherein said baffle means has a transverse dimension which is approximately one-half of the width of said generally rectangularly-shaped opening.

7. The generator of claim 5 or 6, wherein said rectangularly-shaped opening has a width which is less than or equal to about 25% of the diameter of said cylindrical body.

8. The generator of claim 1 including vortex breaker means located adjacent said slurry outlet means.

9. The generator of claim 1 or 2 including sleeve means located on said internal wall and extending for at least part of the arc of the internal wall from the downstream end of said inlet means in the direction of intended motion of said reaction mixture.

10. The generator of claim 1 constructed of titanium.

11. A chlorine dioxide generator constructed of titanium comprising:
a generally right cylindrical vertically-extending body having a side wall, an upper outwardly-domed end closure, a lower conical end closure, gaseous outlet means located in said upper end closure axially of said cylindrical body, and slurry outlet means located in said lower end closure axially of said cylindrical body,
conduit means of generally circular cross-section extending tangentially to said cylindrical body and terminating at its downstream end in an oval opening in said side wall located above the intended liquid level in said body for projection of reaction mixture into said body generally tangentially thereto, and
planar ring baffle means extending substantially horizontally from and perpendicularly with respect to the internal surface of said side wall and located immediately above the oval opening.

12. The generator of claim 11, wherein said gaseous outlet means includes sleeve means projecting downwardly from the inner surface of said upper end closure.

* * * * *